May 31, 1938.  J. HOLLAND-LETZ  2,119,336
ROUGHAGE MILL
Filed May 20, 1936
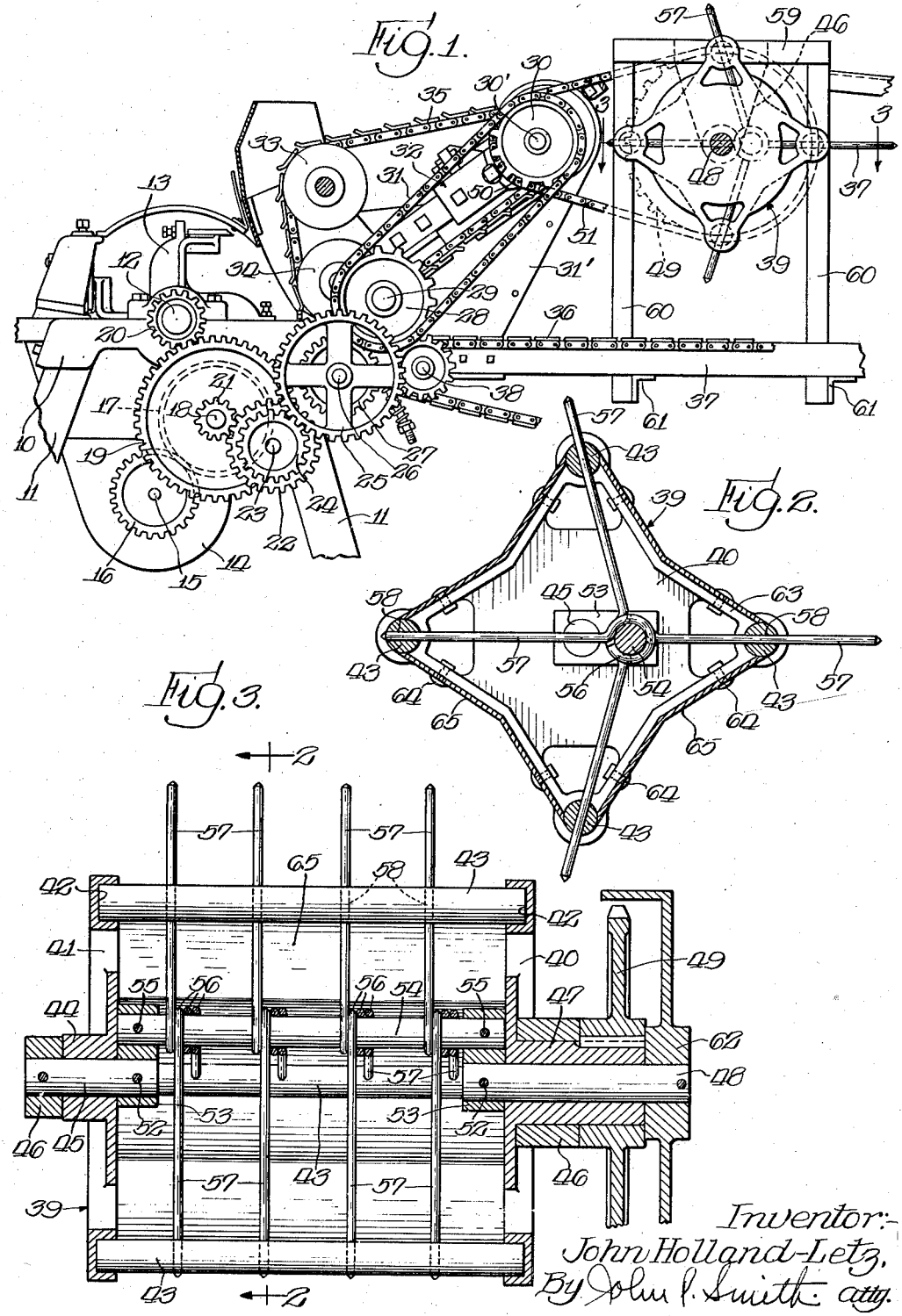
Inventor:-
John Holland-Letz.
By John P. Smith, atty.

Patented May 31, 1938

2,119,336

UNITED STATES PATENT OFFICE 2,119,336

ROUGHAGE MILL

John Holland-Letz, Crown Point, Ind., assignor to The Letz Manufacturing Company, a corporation of Indiana Application May 20, 1936, Serial No. 80,731

6 Claims. (Cl. 146—119)

The present invention relates generally to roughage mills, but more particularly to a feeding mechanism therefor for grabbing, compressing and conveying loose bulky hay and the like material for feeding the same to the cutting mechanism thereof.

Another object of the invention is to provide a novel and improved feeding mechanism for roughage mills and the like in which eccentrically actuated fingers are adapted to penetrate and at the same time compress light, loose, bulky hay and the like material for positively conveying and discharging the same into the cutting mechanism of the roughage mill.

A still further object of the invention is to provide a novel and improved positive gripping and conveying mechanism in combination with a floating or relatively fixed overhead feeding mechanism for efficiently conveying the material to the cutting mechanism of a roughage mill.

These and other objects are accomplished by providing a construction and an arrangement of the various parts in the manner hereinafter described in the appended claims.

Referring to the drawing:

Fig. 1 is a side elevational view partly in cross section of a conventional roughage mill having my improvement embodied therein;

Fig. 2 is a cross sectional view taken on the line 2—2 in Fig. 3; and

Fig. 3 is an enlarged cross sectional view taken on the line 3—3 in Fig. 1.

In illustrating one form of my invention I have shown the same in connection with a conventional roughage mill which comprises a main frame 10 mounted on supporting legs 11. Mounted in suitable bearings in the main frame 10 is a main drive shaft 12 to which is secured a cutter head 13 of conventional form. Positioned below the cutter head 13 is the usual conveyor trough 14 in which is mounted a conveyor screw (not shown) driven by a shaft 15 to the outer end of which is secured a gear 16. The gear 16 meshes with and is operatively driven by a gear 17 secured to a supplemental drive shaft 18. Secured to the shaft 18 adjacent the gear 17 is a large gear 19 which meshes with and is operatively driven by a pinion 20 secured to one end of the main shaft 12. Secured to the outer end of the shaft 18 and driven thereby is a pinion 21 which meshes with and operatively drives a gear 22 which in turn is journaled on a stub shaft 23. Formed integrally with the gears 22 is a gear 24 which meshes with and operatively drives a gear 25. The gear 25 is journaled on a shaft 26 and has formed integrally with the gear 27. The gear 27 meshes with a gear (not shown) formed integrally with a sprocket wheel 28. The sprocket wheel 28 is journaled on a stub shaft 29 and is geared to the sprocket wheel 30 by a chain 31. The sprocket wheel 30 is secured to one end of a shaft 30'. Suitably journaled in opposite side frame members 31' of the roughage mill is an upper floating feed belt frame generally indicated by the reference character 32 of a construction described in detail in my Patent No. 1,925,394 granted September 5, 1933 on Roughage mill. The free end of this frame 32 is provided with spaced apart rollers 33 and 34 and a third roller secured to the shaft 30' located adjacent the pivot of the frame. Trained about these rollers is a continuously driven endless belt 35. Positioned below the floating feed belt 35 is the usual endless conveyor 36 mounted in a suitable longitudinally extending frame 37 of well known construction. This conveyor belt 36 is driven by sprockets (not shown), secured to a shaft 38 adjacent the cutter head.

My improved finger feed roll for compressing, grabbing and conveying fluffy material comprises a polygonal indented drum generally indicated by the reference character 39. This drum includes two end spiders 40 and 41 which have inwardly projecting aligned sockets 42 located adjacent their peripheries which are adapted to receive and have journaled therein pipes or shafts 43. The spider 41 is provided with a hub 44 which in turn is journaled on a stub shaft 45 secured to one of the hanger brackets 46. The other spider 40 is provided with a relatively longer hub as shown at 47 which in turn is journalled on a shaft 48. Secured to the outer end of the hub 47 is a sprocket wheel 49 which is geared to and operatively driven by a sprocket wheel 50 by means of an endless chain 51. (See Fig. 1 of the drawing.) The sprocket wheel 50 is located inwardly of and adjacent to the sprocket wheel 30 and is secured to the shaft 30'. A portion of the hub 47 of the spider 40 is journaled in one of the bearing hangers 46 as clearly shown in Fig. 3 of the drawing. Secured to the inner ends of each of the shafts 45 and 48 by means of pins 52 are offset supports 53 which support an eccentrically located shaft 54 therein by means of pins 55. Pivotally mounted on the eccentric shaft 54 by means of eyes 56 which embrace the shaft 54 are feeder fingers or rods 57. The outer portions of these feeder fingers are adapted to reciprocate in spaced apart apertures 58 located in each of the shafts 43 as clearly shown in Figs. 2 and 3 of the drawing. The hangers 46 are secured to horizontal angle frame members 59 located on the opposite sides of the horizontal conveyor belt 36. These horizontal frame members are supported in position by vertically disposed frame members 60 which in turn have their lower ends secured to the frame support 37 by angle members 61. Secured to the outer end of the shafts 48 is a shield 62 for shielding the sprocket wheel 49. Each of the spiders 40 and 41 is provided with inwardly projecting flanges 63 to which are secured by means of bolts 64 indented metal covering plates 65 for encasing the finger feed roller in the manner clearly disclosed in Fig. 2 of the drawing.

Summarizing the operation of my eccentrically actuated feed roller for roughage mills and the like machine, it will be obvious that upon the operation of the revolving cutter head 13 the transmission mechanism hereinbefore described operatively drives the horizontal conveyor belt 36 as well as the endless belt 35 mounted on the floating feed frame 32. As these parts are driven the revolving finger drum 39 is revolved about its axis on the stationary stub shafts 45 and 48. The revolving of this drum causes the eccentrically located fingers 57 to project rearwardly or on the right hand side as viewed from Fig. 1 a considerable greater distance from the drum through one of the shafts 43 so as to aggressively engage any light fluffy material and compress it against the conveyor belt 36. These fingers convey the material toward the floating feed belt 35 preparatory to feeding the same to the cutter head 13. As these fingers progress in their revolution toward the feed belt 35, it will be noted that they gradually withdraw inwardly with respect to the drum 39 through their respective apertures in the shafts 43. The inward withdrawal of the fingers strip the material from the drum and insure positive feed to the floating feed belt prior to feeding the material to the cutter head. In this connection it will also be observed that by providing a revolving drum in the form of a polygon having projections rather than a cylindrical surface, secures an intermittent compression of the fluffy material being fed to the roughage mill and as a result a more uniform and efficient feed of the material to the cutter head is secured.

While in the above specification I have described my improved finger feeding mechanism in connection with a floating feed belt, it will of course be understood that this particular type of feed roller may be used in connection with a floating or stationary upper feed roll and secures as great an efficiency in feeding various types of material as with the floating feed belt disclosed in Fig. 1 of the drawing.

While in the above specification I have described one embodiment which my invention may assume in practice, it will of course be understood that the same is capable of modification and that modification may be employed without departing from the spirit and scope of the invention as expressed in the following claims.

What I claim as my invention and desire to secure by Letters Patent is:

1. A feeding mechanism for roughage mills and the like comprising a revolving drum in the form of outwardly converging surfaces, stub shafts for supporting said drum, a second shaft mounted within and located eccentrically with respect to said first named shafts, a plurality of spaced apart shafts journaled in said drum, at the point of convergence of said surfaces spaced apart fingers having their inner ends journaled on said eccentrically located shaft and their outer ends reciprocally mounted in said peripheral shafts.

2. A feeding mechanism for roughage mills and the life comprising a revolving member, a shaft for supporting said member, a second shaft supported by and located eccentrically with respect to said first named shaft, said member including two spaced apart spiders having aligned sockets formed therein, shafts journaled in said sockets and having spaced apart substantially radially disposed apertures therein, a plurality of fingers having their inner ends journaled on said eccentrically located shaft and their outer ends reciprocally mounted in said apertures.

3. The combination with a roughage mill including a frame, an endless conveyor mounted on said frame, a cutter head mounted on said frame, of a floating endless feed belt positioned over said conveyor adjacent said cutter head, a revolving drum substantially square in cross-section positioned over said conveyor adjacent said floating feed belt, said drum including two spaced apart spiders, a supporting shaft for said spiders, an eccentrically located shaft supported by said first named shaft, a plurality of spaced apart fingers having their inner ends journaled on said eccentrically located shaft and their outer portions projecting through the corners of said square drum, and a spaced apart shaft located adjacent the periphery of said spiders for reciprocally supporting the outer ends of said fingers.

4. The combination with a roughage mill including a frame, an endless conveyor mounted on said frame, a cutter head mounted on said frame, of a floating endless feed belt positioned over said conveyor adjacent said cutter head, a revolving drum having angular projecting surfaces positioned over said conveyor adjacent said floating feed belt and their other ends projecting through the apexes of said drum, said drum including two spaced apart spiders, a supporting shaft for said spiders, an eccentrically located shaft supported by said first named shaft, a plurality of spaced apart fingers having their inner ends journaled on said eccentrically located shaft, and spaced apart shafts journaled in aligned sockets located adjacent the periphery of said spiders for slidingly receiving the outer ends of said fingers.

5. A feeding mechanism for a roughage mill and the like comprising a revolving drum in the form of outwardly converging surfaces forming a plurality of apexes, and a plurality of eccentrically actuated fingers mounted within said drum and projecting through said apexes.

6. A feeding mechanism for roughage mill and the like comprising a revolving drum in the form of outwardly converging surfaces forming a plurality of apexes, a shaft on which said drum revolves, a second shaft mounted within said drum and eccentrically with respect to said first named shaft, and a plurality of fingers having one of their ends journaled on said second named shaft and the other of their ends reciprocally projecting through the apexes of said drum.

JOHN HOLLAND-LETZ.